(12) United States Patent
Fujibayashi et al.

(10) Patent No.: US 8,399,574 B2
(45) Date of Patent: Mar. 19, 2013

(54) RESIN POWDER COMPOSITION FOR SLUSH MOLDING AND MOLDED ARTICLES

(75) Inventors: Shinya Fujibayashi, Kyoto (JP); Shinji Watanabe, Kyoto (JP); Chikara Ohto, Toyota (JP); Shuji Nakagawa, Toyota (JP); Ikuo Takahashi, Chiba (JP); Shigekazu Suzuki, Chiba (JP)

(73) Assignees: Sanyo Chemical Industries, Ltd., Kyoto (JP); Toyota Jidosha Kabushiki Kaisha, Aichi (JP); Nisshinbo Chemical Inc., Tokyo (JP)

( * ) Notice: Subject to any disclaimer, the term of this patent is extended or adjusted under 35 U.S.C. 154(b) by 131 days.

(21) Appl. No.: 12/529,274

(22) PCT Filed: Dec. 3, 2007

(86) PCT No.: PCT/JP2007/073309
§ 371 (c)(1),
(2), (4) Date: Jan. 19, 2010

(87) PCT Pub. No.: WO2008/108038
PCT Pub. Date: Sep. 12, 2008

(65) Prior Publication Data
US 2010/0144980 A1    Jun. 10, 2010

(30) Foreign Application Priority Data
Mar. 1, 2007   (JP) .................. 2007-051108

(51) Int. Cl.
*C08G 18/02* (2006.01)
*C08G 18/09* (2006.01)
*C08G 18/10* (2006.01)
*C08G 18/48* (2006.01)

(52) U.S. Cl. ......................... 525/457; 528/44

(58) Field of Classification Search .................. 525/457
See application file for complete search history.

(56) References Cited

U.S. PATENT DOCUMENTS

| | | | |
|---|---|---|---|
| 3,835,098 A * | 9/1974 | Brown et al. .................. | 528/288 |
| 5,504,241 A | 4/1996 | Pohl et al. | |
| 5,637,769 A * | 6/1997 | Imashiro et al. ................. | 564/59 |
| 5,834,542 A | 11/1998 | Kielhorn-Bayer et al. | |
| 6,153,718 A | 11/2000 | Imashiro et al. | |
| 6,177,508 B1 | 1/2001 | Ohmori et al. | |
| 6,527,995 B1 * | 3/2003 | Kaufhold et al. ............. | 264/126 |
| 6,559,267 B2 * | 5/2003 | Kaufhold et al. ............... | 528/76 |
| 6,767,954 B2 * | 7/2004 | Meyer-Roscher et al. ... | 524/507 |
| 7,498,379 B2 * | 3/2009 | Kraemer et al. .............. | 524/588 |
| 2005/0107562 A1 | 5/2005 | Leberfinger et al. | |
| 2005/0118424 A1 * | 6/2005 | Takahashi et al. ............ | 428/402 |
| 2006/0045996 A1 | 3/2006 | Fujibayashi et al. | |
| 2007/0287793 A1 * | 12/2007 | Fujibayashi et al. .......... | 524/612 |

FOREIGN PATENT DOCUMENTS

| | | |
|---|---|---|
| CA | 2 271 363 A1 | 11/1999 |
| EP | 1743922 A1 * | 1/2007 |
| JP | 06-287442 A | 10/1994 |
| JP | 07-017939 A | 1/1995 |
| JP | 09-255752 A | 9/1997 |
| JP | 09-272726 A | 10/1997 |
| JP | 10-251414 A | 9/1998 |
| JP | 10-510311 A | 10/1998 |
| JP | 2000-017033 A | 1/2000 |
| JP | 2000-026398 A | 1/2000 |
| JP | 2000-296362 A | 10/2000 |
| JP | 2004-002786 A | 1/2004 |
| JP | 2005-113010 A | 4/2005 |
| JP | 2005-511871 A | 4/2005 |
| WO | 03/051949 A1 | 6/2003 |
| WO | WO 2005111048 A1 * | 11/2005 |

* cited by examiner

*Primary Examiner* — Randy Gulakowski
*Assistant Examiner* — Mike M Dollinger
(74) *Attorney, Agent, or Firm* — Sughrue Mion, PLLC

(57) ABSTRACT

The present invention provides a resin powder composition for slush molding which can give slush molded articles with more excellent hydrolysis resistance. The present invention relates to a resin powder composition for slush molding which is characterized by comprising as the main component a thermoplastic polyurethane resin powder, preferably a thermoplastic polyurethane elastomer powder, and containing a polycarbodiimide prepared by polymerizing tetramethylxylylene diisocyanate, alkoxy terminated one having a number average molecular weight of 500 to 30,000.

11 Claims, No Drawings

RESIN POWDER COMPOSITION FOR SLUSH MOLDING AND MOLDED ARTICLES

CROSS REFERENCE TO RELATED APPLICATIONS

This application is a National Stage of International Application No. PCT/JP2007/073309 filed Dec. 3, 2007, claiming priority based on Japanese Patent Application No. 2007-051108 filed Mar. 1, 2007, the contents of all of which are incorporated herein by reference in their entirety.

TECHNICAL FIELD

The present invention relates to a resin powder composition for slush molding, the resin powder composition being suitable as a molding material for automotive interior components, such as an instrument panel and a door trim, being composed mainly of a thermoplastic polyurethane resin powder, and exhibiting excellent hydrolysis resistance when being molded into an automotive interior component, or the like.

BACKGROUND ART

Automotive interior components or the like maybe exposed to high temperatures and/or high humidities for a long period of time and therefore the skins thereof may decrease in strength. As to resin molded articles made from a thermoplastic resin powder for slush molding, it has recently been found that ester linkages present in a resin may hydrolyzed due to a high temperature and high humidity use environment or the like.

On the other hand, polyester-based polyurethane resins among urethane resins are known to decrease in physical properties of the resins due to hydrolysis of ester linkages in the resins occurring under high temperatures and high humidities over a long period of time. In order to solve this problem, a certain effect has been proved by a carbodiimide compound which forms a bond with a carboxylic acid in a hydrolyzed resin to cause stabilization. (See, for example, patent documents 1-4.)

Patent document 1: JP 9-255752 A
Patent document 2: JP 9-272726 A
Patent document 3: JP 6-287442 A
Patent document 4: JP 10-510311 A However, there has not been known any technological way of resisting degradation at high temperatures and high humidities which can be applied to resin powder compositions for slush molding for producing automotive interior components and the like.

DISCLOSURE OF THE INVENTION

Problems to be Solved by the Invention

A problem to be solved by the present invention is to provide a resin powder composition for slush molding from which a slush molded article with excellent hydrolysis resistance can be produced.

Means for Solving the Problem

The present inventors have accomplished the present invention as a result of earnest investigations.

That is, the present invention is directed to a resin powder composition for slush molding, comprising as the main component a thermoplastic polyurethane resin powder (B) and containing a polycarbodiimide (A) prepared by polymerizing tetramethylxylylene diisocyanate; and to a resin molded article obtained by slush molding the resin powder composition.

Effect of the Invention

Molded resin articles made from the resin powder composition of the present invention for slush molding are excellent in hydrolysis resistance and high in tear strength retention rate.

Molded resin articles made from the resin powder composition of the present invention for slush molding have improved rear surface meltability upon slush molding.

Molded resin articles made from the resin powder composition of the present invention for slush molding exhibit less fading and less gloss change and have improved heat resistance.

BEST MODE FOR CARRYING OUT THE INVENTION

The resin powder composition of the present invention for slush molding is excellent in hydrolysis resistance because it contains a polycarbodiimide (A) prepared by polymerizing tetramethylxylylene diisocyanate. Examples of the polycarbodiimide (A) prepared by polymerizing tetramethylxylylene diisocyanate (henceforth, abbreviated as TMXDI) include a polycarbodiimide made up of TMXDI polymerized. TMXDI is a diisocyanate represented by the following formula (1), which includes m-TMXDI, p-TMXDI, etc. as positional isomers. Among these, m-TMXDI is preferable.

[chemical formula 1]

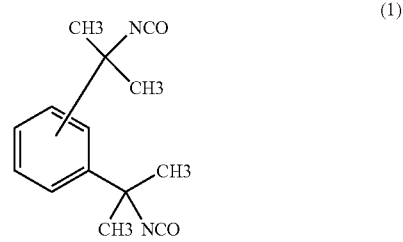

(1)

The number average molecular weight of the polycarbodiimide (A) is preferably 500 or more, more preferably 1,000 or more, even more preferably 2,000 or more, and still more preferably 10,000 or more from the viewpoint of bleed-out from resin due to a low molecular weight. Moreover, it is preferably 30,000 or less, and more preferably 25,000 or less from the viewpoint of the viscosity of polycarbodiimide and securing the fluidity when dissolving resin. The number average molecular weight is measured by gel permeation chromatography (GPC) (a measuring instrument is SHODEX-KF of Showa Denko K. K., for example, and THF is used as a solvent) after capping an NCO group at a terminal of polycarbodiimide with dibutyl amine.

Examples of the terminal group of the polycarbodiimide (A) include an isocyanate group (a terminal group without being capped), alkoxyl groups (for example, an alkoxyl group a terminal isocyanate group thereof having been capped with ethylene glycol monomethyl ether), polyethylene glycol monoalkyl ether residues (for example, a polyethylene glycol monoalkyl ether residue a terminal isocyanate group thereof having been capped with polyethylene glycol monomethyl ether, wherein the polyethylene glycol is one having a molar number of added ethylene oxide of 5 or more) and the like. Among these, alkoxyl groups (for example, methoxy and ethoxy) are preferable from the viewpoint of hydrolysis resistance and heat resistance. An isocyanate group (a terminal group without being capped) is preferable from the viewpoint of hydrolysis resistance. The polycarbodiimide (A) as mentioned above can be produced by synthesizing a polycarbodiimide prepared by polymerizing TMXDIs having isocyanate terminals by a condensation reaction of TMXDI accompanied with elimination of carbon dioxide and, if the terminal groups are alkoxy groups, further causing ethylene glycol monoalkyl ether to react with the polycarbodiimide prepared by polymerizing TMXDIs having isocyanate terminals.

The resin powder composition of the present invention for slush molding contains the polycarbodiimide (A) preferably in an amount of 0.1 to 10% by weight, more preferably 0.5 to 8% by weight, and even more preferably 1 to 5% by weight based on the weight of the thermoplastic polyurethane resin powder (B). When the content of the (A) is 0.1% by weight or more, it is desirable because this makes it possible to obtain a sufficient effect as a stabilizer and when the content of the (A) is 10% by weight or less, it is desirable because this gives no adverse influence on physical properties of molded articles made from the resin powder composition for slush molding.

In the present invention, the thermoplastic polyurethane resin powder (B) (henceforth, also referred to as polyurethane resin powder or simply as (B)) is not particularly limited if it is a polyurethane resin powder which can be used for slush molding. A preferable example includes a thermoplastic polyurethane elastomer powder (C) which exhibits meltability at high temperatures and rubber elasticity at low temperatures.

In the present invention, another thermoplastic resin powder maybe incorporated into the thermoplastic polyurethane resin powder (B). Examples of the additional thermoplastic resin powder include (hereinafter, the term "thermoplastic" is omitted) a polyvinyl chloride resin powder, a polyolefin resin powder, a polyvinyl aromatic resin powder, a polyacrylate resin powder, a conjugated diene resin powder, and mixtures of two or more members of the foregoing. The amount of the additional thermoplastic resin powder is preferably 0 to 100 parts by weight per 100 parts by weight of the (B).

The polyurethane resin in a polyurethane resin powder is a resin synthesized by using a high-molecular weight polyol, a polyisocyanate and, according to need, a low-molecular weight diol, a low-molecular weight diamine and a low-molecular weight monool as raw materials.

Examples of the polyurethane resin powder include products obtained by the following production methods.
(1) Products having a urethane linkage and a urea linkage and produced by a method in which an isocyanate group-terminated urethane prepolymer is caused to react with a blocked chain-extension agent (e.g., a ketimine compound) in the presence of water and a dispersion stabilizer. Specifically, those disclosed in JP 8-120041 A, etc. can be used, for example.
(2) Products produced by a method in which a urethane prepolymer having a urethane linkage and a urea linkage is caused to react with a chain-extension agent (e.g., a diamine and/or a diol) in the presence of an organic solvent in which the urethane prepolymer is insoluble and a dispersion stabilizer. Specifically, those disclosed in JP 4-202331 A, etc. can be used, for example.
(3) Products produced by a method in which a massive thermoplastic polyurethane resin is obtained by causing a diisocyanate to react with a high-molecular weight diol and, as necessary, with a chain-extension agent (i.e., a low-molecular weight diol or a low-molecular weight diamine), and then subjecting the massive resin to powderization (e.g., freeze pulverization or a method of causing the massive resin in a molten state to pass through small holes to cut it).

Examples of the polyvinyl chloride resin powder include vinyl chloride homopolymers produced by suspension polymerization or bulk polymerization and resin powders of copolymers made up of a vinyl chloride monomer as a main component, such as a vinyl chloride-ethylene vinyl acetate copolymer.

Any material which is a member generally belonging to an olefin-based thermoplastic elastomer may be used as the polyolefin resin powder. Moreover, olefin-based thermoplastic elastomers resulting from combination of an ethylene-propylene-diene rubber (EPM, EPDM) and a polyolefin, such as a propylene-based polymer, can be provided as examples of the polyolefin resin powder. Furthermore, a fine powder of an olefin thermoplastic elastomer composed of an α-olefin copolymer and a fine powder of an olefin thermoplastic elastomer composed of an α-olefin copolymer and a propylene-based resin can also be used.

The polyvinyl aromatic resin powder include resin powders of aromatic vinyl compound homopolymers and copolymers of an aromatic vinyl compound and a vinyl monomer. Examples of the aromatic vinyl compound include styrene, tert-butylstyrene, α-methylstyrene, p-methylstyrene, divinylbenzene, 1,1-diphenylstyrene, bromostyrene, vinylstyrene, vinylxylene, fluorostyrene, ethylstyrene and the like. Styrene and α-methylstyrene are especially preferable.

Examples of the polyacrylate resin powder include resin powders of (meth)acrylic acid ester homopolymers and copolymers of a (meth)acrylic acid ester and a vinyl monomer.

The conjugated diene resin powder is a copolymer obtained by hydrogenating or partially hydrogenating conjugated diene-derived moieties in a conjugated diene-based copolymer, and examples thereof include resin powders of hydrogenated aromatic vinyl compound-conjugated diene compound random copolymers, hydrogenated aromatic vinyl compound-conjugated diene compound block copolymers and hydrogenated conjugated diene compound block copolymers.

The volume average particle diameter of the thermoplastic polyurethane resin powder (B) is preferably within the range of 10 to 500 μm, more preferably within the range of 70 to 300 μm.

To the resin powder composition of the present invention for slush molding may, according to need, be blended other additives as far as a mold is not stained and blocking is prevented. Examples of such additives include conventional pigments, inorganic fillers, plasticizers, release agents, organic fillers, dispersing agents, UV absorbers (light stabilizers) antioxidants, and the like.

The amount of the additives blended is preferably 0 to 60% by weight, more preferably 10 to 50% by weight relative to the weight of the thermoplastic polyurethane resin powder (B).

Examples of the method for producing the resin powder composition of the present invention for slush molding include the following methods, which are examples using a urethane resin. Production using other thermoplastic resins can be performed according to these methods.
(1) When a polyurethane resin is synthesized, a polycarbodiimide (A) is mixed with at least either one of a high-molecular weight diol and a diisocyanate.
(2) The (A) is mixed with a urethane prepolymer.

(3) Mixing with a plasticizer, a pigment, a stabilizer, etc., which are added according to need, is performed.
(4) The foregoing three methods are used in combination.

Among these, method (2) is preferred.

While the polycarbodiimide (A) may be added in the form of a solid powder or a solution, it is preferably added in the form of a solution.

Conventional powder mixers can be used as a mixer to be used for the mixing mentioned above. Any of a container rotation type mixer, a stationary container type mixer and a fluid moving type mixer can be used. Dry-blending methods using stationary container mixers, such as high-speed flow mixers, multi-shaft paddle type mixers, high-speed shear mixers (Henschel mixer (registered trademark), etc.), low-speed mixers (planetary mixer, etc.) or conical screw mixers (Nauta mixer (registered trademark), etc.) are well-known. Among these methods, it is preferable to use multi-shaft paddle type mixers, low-speed mixers (planetary mixer, etc.), or conical screw mixers (Nauta mixer (registered trademark, henceforth omitted), etc.).

Molded resin articles made from the resin powder composition of the present invention for slush molding can be made by slush molding. For example, slush molding can be performed preferably by a method which comprises vibrating and rotating a box containing the powder composition of the present invention together with a heated mold and melt and flow the powder in the mold, followed by cooling and subsequent solidification, thereby producing a skin. The mold temperature is preferably 200 to 300° C., more preferably 210 to 280° C.

The thickness of a skin formed from the resin powder composition of the present invention for slush molding is preferably 0.5 to 1.5 mm. The formed skin can be fabricated into a molded resin article by setting it onto a foaming mold so that its front surface will come into contact with the foaming mold, pouring urethane foam and forming a foam layer with a thickness of 5 mm to 15 mm on the rear surface of the skin.

The molded resin article of the present invention is used suitably for automotive interior components, such as an instrument panel and a door trim.

EXAMPLES

The present invention will be described below in detail with reference to production examples and examples, to which the present invention is not limited. In the following description, all "parts" represent parts by weight and all "%" represent % by weight.

Production Example 1

Production of a Prepolymer Solution

To a reactor equipped with a thermometer, a stirrer and a nitrogen blowing tube were charged polybutylene adipate having a number average molecular weight (hereinafter, Mn) of 1000 (497.9 parts), polyhexamethylene isophthalate having an Mn of 900 (124.5 parts), pentaerythritol tetrakis [3-(3, 5-di-tert-butyl-4-hydroxyphenyl) propionate] [IRGANOX 1010 produced by Ciba Speciality Chemicals] (1.12 parts) and kaolin having a volume average particle diameter of 9.2 µm (90.7 parts). After nitrogen purge, the materials were heated to 110° C. to melt and then cooled to 60° C. while being stirred. Then 1-octanol (9.7 parts), hexamethylene diisocyanate (153.4 parts), tetrahydrofuran (125 parts), 2-(2H-benzotriazol-2-yl)-6-(straight chain and side chain dodecyl)-4-methylphenol [TINUVIN 571 produced by Ciba Speciality Chemicals] (2.22 parts) and polycarbodiimide (A-1) of TMXDI (TMXDI was m-form and was 98% in purity) [Mn=15,000, terminal group: methoxy group, form: 70% solution in methyl ethyl ketone (hereinafter, MEK), Carbodilite V-09M manufactured by Nisshinbo Industries, Inc.] (2.15 parts) were charged and caused to react at 85° C. for 6 hours, yielding a prepolymer solution (C-1). The NCO content of the (C-1) was 2.05%.

Production Example 2

Production of an MEK Ketimine Compound of a Diamine

While refluxing hexamethylene diamine and excessive MEK (4 molar times in amount relative to the amount of the diamine) at 80° C. for 24 hours, water generated was removed to the outside of the system. Then unreacted MEK was removed under reduced pressure, yielding a MEK ketimine compound.

Production Example 3

Production of a Thermoplastic Polyurethane Resin Powder

The prepolymer solution (C-1) (100 parts) obtained in Production Example 1 and the MEK ketimine compound (5.6 parts) obtained in Production Example 2 were charged into a reactor, and 340 parts by weight of an aqueous solution in which a dispersing agent (SANSPARL PS-8 produced by Sanyo Chemical Industries, Ltd.) (1.3 parts by weight) containing Na salt of a copolymer of diisobutylene and maleic acid had been dissolved was added thereto, followed by mixing at a rotation speed of 9000 rpm for one minute by using an ultra disperser manufactured by Yamato Scientific Co., Ltd. This mixture was transferred into a reactor equipped with a thermometer, a stirrer and a nitrogen blowing tube and after nitrogen purge it was caused to react at 50° C. for 10 hours while being stirred. After completion of the reaction, filtration separation and drying were performed, a thermoplastic polyurethane resin powder (B-1), which was a thermoplastic polyurethane elastomer powder was obtained. The (B-1) had an Mn of 25,000 and a volume average particle diameter of 155 µm.

Example 1

Production of a Resin Composition Powder for Slush Molding

Into a 100-L Nauta mixer were charged the thermoplastic polyurethane resin powder (B-1) (100 parts), aromatic condensed phosphate [CR-741 produced by Daihachi Chemical Industry Co., Ltd.] (13.6 parts), dipentaerythritol pentaacrylate [DA600 produced by Sanyo Chemical Industries, Ltd.] (3.9 parts), bis(1,2,2,6,6-pentamethyl-4-piperidyl)sebacate and methyl 1,2,2,6,6-pentamethyl-4-piperidyl sebacate (mixture) [commercial name: TINUVIN 765 produced by Ciba] (0.27 parts), followed by mixing at 80° C. for two hours. Then dimethyl polysiloxane [L45-1000, produced by Nippon Unicar Co., Ltd.] (0.1 parts) and carboxyl-modified silicone [X-22-3710, produced by Shin-Etsu Chemical Co., Ltd.] (0.1 parts) were charged, mixed for one hour, and then cooled to room temperature. Finally, crosslinked polymethyl methacrylate [GANZPEARL PM-030S, produced by Ganz Chemical Co., Ltd.] (0.3 parts) was charged and mixed, yielding a resin powder composition for slush molding (D-1). The volume average particle diameter of the (D-1) was 155 µm. The amount, expressed in % by weight, of the polycarbodiimide (A-1) resulting from polymerization of tetramethylxylylene diisocyanate contained in the (D-1) was 1.0% by weight relative to the weight of the thermoplastic polyurethane resin powder (B-1).

Example 2

A prepolymer solution (C-2) was obtained in the same manner as in Production Example 1, except for using 9.68 parts of the (A-1) instead of 2.15 parts of the (A-1) in Production Example 1. The NCO content of the (C-2) was 1.95%. Then a thermoplastic polyurethane resin powder (B-2) was obtained in the same manner as in Production Example 3, and by using this product a resin powder composition for slush molding (D-2) was obtained in the same manner as in Example 1. The volume average particle diameter of the (D-2) was 155 μm. The amount, expressed in % by weight, of the polycarbodiimide (A-1) resulting from polymerization of tetramethylxylylene diisocyanate contained in the (D-2) was 4.5% by weight relative to the weight of the thermoplastic polyurethane resin powder (B-2).

Example 3

A prepolymer solution (C-3) was obtained in the same manner as in Production Example 1, except for using 1.51 parts of a polycarbodiimide (A-2) resulting from polymerization of TMXDI (TMXDI was m-form and was 98% in purity) [Mn=2,000, terminal group: PEG monomethyl ether residue (the molar number of ethylene oxide added: 10), form: liquid, Elastostab H01 produced by Nisshinbo Industries, Inc.] instead of 2.15 parts of the (A-1) in Production Example 1. The NCO content of the (C-3) was 2.08%. Then a thermoplastic polyurethane resin powder (B-3) was obtained in the same manner as in Production Example 3, and by using this product a resin powder composition for slush molding (D-3) was obtained in the same manner as in Example 1. The volume average particle diameter of the (D-3) was 125 μm. The amount, expressed in % by weight, of the polycarbodiimide (A-2) resulting from polymerization of tetramethylxylylene diisocyanate contained in the (D-3) was 1.0% by weight relative to the weight of the thermoplastic polyurethane resin powder (B-3).

Example 4

A prepolymer solution (C-4) was obtained in the same manner as in Production Example 1, except for using 1.51 parts of a polycarbodiimide (A-3) resulting from polymerization of TMXDI (TMXDI was m-form and was 98% in purity) [Mn=800, terminal group: isocyanate group, form: liquid, Carbodilite V-05 produced by Nisshinbo Industries, Inc.] instead of 2.15 parts of the (A-1) in Production Example 1. The NCO content of the (C-4) was 2.18%. Then a thermoplastic polyurethane resin powder (B-4) was obtained in the same manner as in Production Example 3, and by using this product a resin powder composition for slush molding (D-4) was obtained in the same manner as in Example 1. The volume average particle diameter of the (D-4) was 152 μm. The amount, expressed in % by weight, of the polycarbodiimide (A-3) resulting from polymerization of tetramethylxylylene diisocyanate contained in the (D-4) was 1.0% by weight relative to the weight of the thermoplastic polyurethane resin powder (B-4).

Comparative Example 1

A prepolymer solution (C-5) was obtained in the same manner as in Production Example 1, except for using no (A-1) instead of 0.8 parts of the (A-1) in Production Example 1. The NCO content of the (C-5) was 2.10%. Then a thermoplastic polyurethane resin powder (B-5) was obtained in the same manner as in Production Example 3, and by using this product a resin powder composition for slush molding (D-5) was obtained in the same manner as in Example 1. The volume average particle diameter of the (D-5) was 155 The amount, expressed in % by weight, of polycarbodiimide resulting from polymerization of tetramethylxylylene diisocyanate contained in the (D-5) was 0% by weight relative to the weight of the thermoplastic polyurethane resin powder (B-5).

Comparative Example 2

A prepolymer solution (C-6) was obtained in the same manner as in Production Example 1, except for using 3.0 parts of a polycarbodiimide (A-4) resulting from polymerization of 4,4-dicyclohexylmethane diisocyanate [Mn=2,000, terminal group: methoxy group, form: 50% solution in toluene, Carbodilite V-03 produced by Nisshinbo Industries, Inc.] instead of 2.25 parts of the (A-1) in Production Example 1. The NCO content of the (C-6) was 2.05%. Then a thermoplastic polyurethane resin powder (B-6) was obtained in the same manner as in Production Example 3, and by using this product a resin powder composition for slush molding (D-6) was obtained in the same manner as in Example 1. The volume average particle diameter of the (D-6) was 150 μm. The amount, expressed in % by weight, of the polycarbodiimide (A-4) resulting from polymerization of 4,4-dicyclohexylmethane diisocyanate contained in the (D-6) was 1.0% by weight relative to the weight of the thermoplastic polyurethane resin powder (B-6).

Skins were formed by the method described below by using the resin powder compositions for slush molding (D-1) to (D-4) of Examples 1 to 4, and the resin powder composition for slush molding (D-5) and (D-6) of Comparative Examples 1 and 2, respectively. Then, the rear surface meltability was examined and a hydrolysis resistance test was performed. Moreover, foam molded articles having skin layers were molded by the method described below and then a heat resistance test was performed. The result is shown in Table 1.

<Preparation of Skin>

A resin powder composition for slush molding was fed into a Ni electroformed mold with a grain which had been heated at 270° C. and after a lapse of 10 seconds an excess resin powder composition was discharged. After further heating at 230° C. for 90 seconds, cooling with water was performed to yield a skin (thickness: 1 mm). Then, the rear surface meltability of this formed skin was evaluated and a hydrolysis resistance test was performed using the skin.

<Preparation of a Foam Molded Article Having a Skin Layer>

A skin prepared by the method described above was set to a mold and then a urethane foam forming material [composed of 95 parts of HO chipped polypropylene triol (number average molecular weight: 5,000), 5 parts of triethanolamine, 2.5 parts of water, 1 part of triethylamine and 61.5 parts of polymeric MDI] was added on the skin, resulting in foaming and close adhesion. Thus, foam molded articles having the respective skin layers were obtained. A heat resistance test was carried out by using the molded articles.

<Hydrolysis Resistance Test>

A formed skin was treated in a thermo-hygrostat at a temperature of 80° C. and a humidity of 95% RH for 400 hours. After the test, the tear strength of the skin was measured and was compared with the initial strength.

The tear strength retention rate after the hydrolysis resistance test was calculated by using the following formula (1).

Tear strength retention rate (%)=(tear strength after hydrolysis resistance test/tear strength before hydrolysis resistance test)×100 (1)

<Heat Resistance Test>

A foam molded article was treated in a circulation dryer at 110° C. for 1260 hours. After the test, the fading and the gloss of the skin were examined.

Criteria

Rear Surface Meltability

At the center of the rear surface of a molded article, the meltability was evaluated according to the following criteria.
5: It is uniform and gloss is observed.
4: Some powder remains unmelted but gloss is observed.
3: Irregularities are on the overall rear surface and no gloss is observed. There is no pinhole penetrating to the front surface.
2: There are irregularities in the form of powder on the overall rear surface, but there is no pinhole penetrating to the front surface.
1: The powder does not melt, failing to form a molded article.

Fading

Skin samples were visually observed and were evaluated according to the following criteria.
○: No discoloration was observed.
Δ: Discoloration was observed.
×: Severe discoloration was observed.

Gloss

The gloss was measured by using a glossimeter (portable glossimeter GMX-202 manufactured by Murakami Color Research Laboratory Co., Ltd.). The higher the gloss value is, the more glossy the sample is.

Tear Strength

Three tearing test pieces of dumbbell B type according to JIS K 6301 (1995) were stamped out of a skin sample. As to the thickness of a test piece, the smallest value of measurements taken at five points located near the curved part was determined as the thickness of the test piece. Each of the test pieces was attached to an autograph and was pulled at a rate of 200 mm/min. The maximum strength achieved before the test piece broke was calculated.

The increased tear strength retention rates show that the hydrolysis resistance has been improved.

In heat resistance tests, Examples 1 to 4 exhibit less fading and less gloss change and therefore have improved in heat resistance in comparison to Comparative Examples 1 and 2.

Examples 1 to 4 are preferable because of their good rear surface meltability in comparison to Comparative Examples 1 and 2.

Industrial Applicability

Skin materials molded from resin powder compositions of the present invention for slush molding are used suitably as skin materials of automotive interior components, e.g., instrument panels and door trims.

The invention claimed is:

1. A resin powder composition for slush molding, comprising as the main component a thermoplastic polyurethane resin powder (B) and containing a polycarbodiimide (A) having a number average molecular weight of 10,000 to 30,000 and prepared by polymerizing tetramethylxylylene diisocyanate,
   wherein a terminal group of the polycarbodiimide (A) is an isocyanate group, an alkoxyl group or a polyethylene glycol monoalkyl ether residue,
   wherein the thermoplastic polyurethane resin powder (B) is a product having a urethane linkage and a urea linkage and produced by a method in which an isocyanate group-terminated urethane prepolymer is caused to react with a ketimine compound in the presence of water and a dispersion stabilizer, and
   wherein, the polycarbodiimide (A) is mixed with at least either one of a high-molecular weight diol and a diisocyanate when a polyurethane resin in the polyurethane resin powder (B) is synthesized.

2. The resin powder composition according to claim 1, wherein a terminal group of the polycarbodiimide (A) is an alkoxyl group.

3. The resin powder composition according to claim 1, wherein the thermoplastic polyurethane resin powder (B) is a thermoplastic polyurethane elastomer powder (C).

4. A resin molded article obtained by slush molding the resin powder composition according to claim 1.

TABLE 1

| | Rear surface meltability (grade) | Hydrolysis resistance test | | | | Heat resistance test | |
| | | Tear strength (kN/m) | | Tear strength retention rate (%) | Fading | Gloss | |
| | | Before test | After test | | | Before test | After test |
|---|---|---|---|---|---|---|---|
| Example 1 | 5 | 50 | 35 | 70 | ○ | 1.0 | 1.6 |
| Example 2 | 5 | 45 | 40 | 89 | ○ | 1.0 | 1.4 |
| Example 3 | 5 | 45 | 28 | 62 | ○ | 1.0 | 1.7 |
| Example 4 | 4.5 | 50 | 40 | 80 | ○ | 1.0 | 2 |
| Comparative Example 1 | 4 | 52 | 1 | 2 | Δ | 1.0 | 2.5 |
| Comparative Example 2 | 4 | 29 | 15 | 52 | Δ | 1.0 | 2.4 |

Table 1 shows that Examples 1 to 4, in which carbodiimides derived from TMXDI were added, exhibit higher tear strength retention rates in comparison to Comparative Example 1 (no carbodiimide was added) and Comparative Example 2 (a carbodiimide other than TMXDI was added).

5. The resin molded article according to claim 4, which is an automotive interior component.

6. The resin powder composition according to claim 2, wherein the thermoplastic polyurethane resin powder (B) is a thermoplastic polyurethane elastomer powder (C).

7. A resin powder composition for slush molding, comprising as the main component a thermoplastic polyurethane resin powder (B) and containing a polycarbodiimide (A) having a number average molecular weight of 10,000 to 30,000 and prepared by polymerizing tetramethylxylylene diisocyanate, wherein a terminal group of the polycarbodiimide (A) is an isocyanate group, an alkoxyl group or a polyethylene glycol monoalkyl ether residue, wherein the thermoplastic polyurethane resin powder (B) is a product having a urethane linkage and a urea linkage and produced by a method in which an isocyanate group-terminated urethane prepolymer is caused to react with a ketimine compound in the presence of water and a dispersion stabilizer, and wherein, the polycarbodiimide (A) is mixed with the urethane prepolymer.

8. A method for producing a resin powder composition for slush molding, comprising:

preparing a polycarbodiimide (A) having a number average molecular weight of 10,000 to 30,000 and is produced by polymerizing tetramethylxylylene diisocyanate, wherein a terminal group of the polycarbodiimide (A) is an isocyanate group, an alkoxyl group or a polyethylene glycol monoalkyl ether residue, and producing a polyurethane resin powder (B) by a method in which an isocyanate group-terminated urethane prepolymer is caused to react with a ketimine compound as a blocked chain-extension agent in the presence of water and a dispersion stabilizer, wherein the polycarbodiimide (A) is mixed with at least either one of a high-molecular weight diol and a diisocyanate when a polyurethane resin in the polyurethane resin powder (B) is synthesized.

9. The method for producing a resin powder composition for slush molding according to claim 8, further comprising:

mixing with a plasticizer, a pigment or a stabilizer.

10. A method for producing a resin powder composition for slush molding, comprising:

preparing a polycarbodiimide (A) having a number average molecular weight of 10,000 to 30,000 and is produced by polymerizing tetramethylxylylene diisocyanate, wherein a terminal group of the polycarbodiimide (A) is an isocyanate group, an alkoxyl group or a polyethylene glycol monoalkyl ether residue, and producing a polyurethane resin powder (B) by a method in which an isocyanate group-terminated urethane prepolymer is caused to react with a ketimine compound as a blocked chain-extension agent in the presence of water and a dispersion stabilizer, wherein the polycarbodiimide (A) is mixed with the urethane prepolymer.

11. The method for producing a resin powder composition for slush molding according to claim 10, further comprising:

mixing with a plasticizer, a pigment or a stabilizer.

\* \* \* \* \*